US012762374B2

(12) United States Patent
Sun et al.

(10) Patent No.: US 12,762,374 B2
(45) Date of Patent: Oct. 13, 2026

(54) MULTI-DISASTER FUSION NATURAL FISSION EARLY WARNING METHOD AND SYSTEM IN COAL MINE

(71) Applicant: CCTEG CHONGQING RESEARCH INSTITUTE, Chongqing (CN)

(72) Inventors: Haitao Sun, Chongqing (CN); Zhigang Zhang, Chongqing (CN); Yabo He, Chongqing (CN); Wenji Han, Chongqing (CN); Gangli Yao, Chongqing (CN); Shan Si, Chongqing (CN); Hao Wang, Chongqing (CN); Yun Sun, Chongqing (CN); Lang Li, Chongqing (CN); Na Yang, Chongqing (CN); Yanbao Liu, Chongqing (CN); Xusheng Zhao, Chongqing (CN); Rongjun Si, Chongqing (CN); Shengjun Guo, Chongqing (CN); Yunbing Hu, Chongqing (CN); Hanying Tang, Chongqing (CN); Mingjian Li, Chongqing (CN); Haisheng Wang, Chongqing (CN); Fuxiang Wu, Chongqing (CN); Jun Xu, Chongqing (CN)

(73) Assignee: CCTEG CHONGQING RESEARCH INSTITUTE, Chongqing (CN)

( * ) Notice: Subject to any disclaimer, the term of this patent is extended or adjusted under 35 U.S.C. 154(b) by 0 days.

(21) Appl. No.: 18/862,173

(22) PCT Filed: Apr. 11, 2024

(86) PCT No.: PCT/CN2024/087107

§ 371 (c)(1),
(2) Date: Nov. 1, 2024

(87) PCT Pub. No.: WO2024/222460

PCT Pub. Date: Oct. 31, 2024

(65) Prior Publication Data

US 2026/0111703 A1 Apr. 23, 2026

(30) Foreign Application Priority Data

Apr. 24, 2023 (CN) ......................... 202310449786.4

(51) Int. Cl.
*G06N 3/0442* (2023.01)
*G06F 18/25* (2023.01)
(Continued)

(52) U.S. Cl.
CPC ........... *G06N 3/0442* (2023.01); *G06F 18/25* (2023.01); *G06N 3/09* (2023.01); *G08B 21/10* (2013.01)

(58) Field of Classification Search
CPC ........ G06N 3/0442; G06N 3/09; G06F 18/25; G08B 21/10
(Continued)

(56) References Cited

U.S. PATENT DOCUMENTS 11,640,163 B1 * 5/2023 Nguyen ............. G05B 23/0221 702/183
12,333,470 B1 * 6/2025 Shao ...................... G16Y 20/10
(Continued)

FOREIGN PATENT DOCUMENTS

CN 106813976 A 6/2017
CN 109184800 A 1/2019
(Continued)

OTHER PUBLICATIONS

Cheng Liu, et al, Intelligent prevention and control technology of many coal mine disasters and intelligent monitoring technology, Intelligent Mines, 3(7), Jul. 31, 2022.
(Continued)

*Primary Examiner* — Kerri L Mcnally
(74) *Attorney, Agent, or Firm* — Westbridge IP LLC

(57) ABSTRACT

The present invention discloses a coal mine multi-disaster fusion early warning method and system, applicable in coal
(Continued)

mine safety disaster analysis. First, it builds a model and relationship network among multi-disaster early warning entities, updating the network by specific rules. A trend prediction model using an LSTM artificial neural network is then developed for monitoring object trends, along with natural fission analysis rules. Next, a method for identifying anomalies in single disaster events is established through a disaster index prediction and early warning system. Upon detecting an anomaly in an early warning index, other disaster indexes are assessed using a depth-first traversal algorithm and natural fission rules, facilitating targeted forecasting. This invention builds a predictive relationship chain among early warning indexes through correlation analysis, providing advantages in multi-dimensional analysis and advanced trend prediction.

10 Claims, 3 Drawing Sheets

(51) Int. Cl.
*G06N 3/09* (2023.01)
*G08B 21/10* (2006.01)

(58) Field of Classification Search
USPC .......................................................... 340/540
See application file for complete search history.

(56) References Cited

U.S. PATENT DOCUMENTS

| | | | | |
|---|---|---|---|---|
| 2021/0248241 | A1* | 8/2021 | Balkanski | G06V 20/95 |
| 2021/0390230 | A1* | 12/2021 | Zou | G06N 3/0895 |

FOREIGN PATENT DOCUMENTS

| | | | |
|---|---|---|---|
| CN | 110264673 | A | 9/2019 |
| CN | 110472729 | A | 11/2019 |
| CN | 114418255 | A | 4/2022 |
| CN | 114841398 | A | 8/2022 |
| WO | WO2023056695 | A1 | 4/2023 |

OTHER PUBLICATIONS

Utsav Kumar Malviya, et al., "Multiple Agents based Disaster Prediction for Public Environments using Data Mining Techniques" 2023 2nd International Conference for Innovation in Technology, Apr. 19, 2023.

Office Action of corresponding CN application 202310449786.4, published on May 6, 2024.

Notice of Grant of Patent Right of corresponding CN Application 202310449786.4, published on Jun. 20, 2024.

The grant claims of corresponding CN Application 202310449786.4.

* cited by examiner

MULTI-DISASTER FUSION NATURAL FISSION EARLY WARNING METHOD AND SYSTEM IN COAL MINE

FIELD OF INVENTION

The present invention belongs to the technical field of coal mine safety disaster analysis, and relates to a coal mine disaster fusion early warning method and system, in particular to a coal mine multi-disaster fusion natural fission early warning method and system.

BACKGROUND ART OF THE INVENTION

At present, the prior art has formed a technical system of disaster monitoring and disaster control for various disasters and proposed a large number of prediction and early warning methods for a single disaster, providing effective technical means for pre-disaster early warning, escape from disasters and post-disaster analysis. However, various prediction methods can only find a single cause of disaster, but cannot effectively connect all kinds of monitoring data in series to make full use of data value.

The occurrence of one kind of coal mine disaster is often accompanied by breeding and development of secondary disasters, and the occurrence of various disasters has spatial-temporal correlation. Nowadays, the analysis of time sequences has developed into a systematic discipline, and various kinds of deep recurrent neural networks are in the ascendant. By combining the statistical theory with machine learning, the sensor monitoring objects related to various coal mine disasters are fused and analyzed to make the objects subjected to natural fission based on correlation, thus making it possible to achieve correlation analysis and data prediction.

DISCLOSURE OF THE INVENTION

In view of this, the technical problem to be solved by the present invention is to provide a coal mine multi-disaster fusion natural fission early warning method, which can traverse the relationship network of coal mine early warning objects based on the natural fission rules when the coal mine disaster prediction and early warning index is abnormal, find prediction and early warning indexes of other disasters with potential impact in a timely and complete manner and carry out targeted prediction and forecasting to realize multi-disaster fusion early warning.

The purpose of the present invention is achieved as follows:

A coal mine multi-disaster fusion natural fission early warning method, comprising the following steps:

S1: building a relationship model among coal mine multi-disaster fusion early warning object entities, constructing a relationship network of the coal mine multi-disaster fusion early warning object entities, and updating the network by rules;

S2: building a sensor monitoring object trend prediction model based on a long short term memory (LSTM) model of an LSTM artificial neural network, and establishing natural fission analysis rules;

S3: establishing an early anomaly identification method for a single disaster of a coal mine based on a disaster index prediction method and a disaster early warning system;

S4: after a disaster prediction and early warning index of a coal mine is abnormal, traversing other disaster prediction and early warning indexes based on a depth-first traversal algorithm and natural fission rules, suggesting that targeted prediction and forecasting should be carried out to realize multi-disaster fusion early warning.

Optionally, in the S1, the coal mine multi-disaster fusion early warning object entities include prediction and early warning indexes for a single disaster and sensor monitoring objects;

If a sequence $\{x_t\}$ of an object X and a sequence $\{y_t\}$ of an object Y have a relationship set R, the relationship therebetween is defined as $$X \overset{R}{\longleftrightarrow} Y;$$

According to different ways of relationship acquisition, the relationship is divided into a relationship $R_1$ based on a formation mechanism and a production process, a position relationship $R_2$ based on spatial topology and a numerical relationship $R_3$ based on a correlation coefficient; the relationship $R_1$ is inquired from coal mine disaster prediction and early warning data and production process specifications; the relationship $R_2$ is obtained by a spatial topology algorithm of a coal mine geographic information system; and the relationship $R_3$ is solved by a correlation coefficient index for a pooling value sequence for a specific time window;

A relationship weight $w_R$ of the objects X and Y is the sum of multiple relationship weights thereof, and the specific formula is as follows:

$$w_R = \sum_{i=1,2,3} w_{R_i} \tag{1}$$

wherein $w_{R_i}$ is a weight corresponding to an $i^{th}$ relationship type between the objects X and Y; and a corresponding relationship between a relationship type and a relationship weight of multi-disaster fusion natural fission objects is:

The relationship type is a mechanism process relationship $R_1$, an assessment index is a mechanism process, a relationship weight of a physical mechanics relationship is 1, and a relationship weight of upstream and downstream of the process is 0.5;

The relationship type is a position relationship $R_2$, an assessment index is spatial topology, a relationship weight of inclusion or intersection is 0.5, and a relationship weight of adjacency within 20 m is 0.2;

The relationship type is a numerical relationship $R_3$, an assessment index is a correlation coefficient index P, a relationship weight of $P\in(0.8,1]$ is 0.8, a relationship weight of $P\in(0.6,0.8]$ is 0.5, and a relationship weight of $P\in(0.4,0.6]$ is 0.2.

Optionally, the numerical relationship $R_3$ is solved by a correlation coefficient of a pooling value sequence for a specific time window, specifically:

For a prediction and early warning index A and a sensor monitoring object B corresponding to a coal mine disaster, a time step of A is set to $\Delta t$; based on data in the most recent period, a maximum value, a minimum value and a mean value of a pooling index of B in a time window $\Delta t$ are used to generate a pooling sequence $B_k$, wherein k=1, 2, 3; then a correlation coefficient $r_k$ of a sequence pair of A and $B_k$ is calculated; a time window of the prediction and early warning index A is $\Delta t$, and a correlation coefficient index of the prediction and early warning index A and the sensor monitoring object B is calculated by the following formula:

$$P_{AB} = \max_{k=1,2,3}(|r_k|) \tag{2}$$

For a sensor monitoring object $B_p$ and a sensor monitoring object $B_q$, based on the data in data in the most recent period, the mean value of the pooling index in the time window is used to obtain two mean sequences $\overline{B_p}$ and $\overline{B_q}$, then a correlation coefficient absolute value $|r_{pq}|$ of the sequence pair is calculated, and a correlation coefficient index of the sensor monitoring objects $B_p$ and $B_q$ is calculated by the following formula:

$$P_{B_pB_q} = |r_{pq}|. \tag{3}$$

Optionally, in the S1, the step of constructing a relationship network of coal mine multi-disaster fusion early warning objects and updating the network by rules is specifically:

For a disaster prediction and early warning index set $\{A_i\}$ and a sensor monitoring object set $\{B_j\}$, i, $j \in R^+$, relationships $R_1$, $R_2$ and $R_3$ between $A_i$ and $B_j$ are analyzed in turn, a relationship weight $w_R$ is looked up in a table and calculated, and a relationship $$A_i \overset{R:w_R}{\longleftrightarrow} B_j$$

is established when $w_R \geq 1$; for the sensor monitoring object set $\{B_j\}$, $j \in R^+$, relationships $R_1$, $R_2$ and $R_3$ between objects $B_p$ and $B_q$ are analyzed in turn, a relationship weight $w_R$ is looked up in a table and calculated, and a relationship $$B_p \overset{R:w_R}{\longleftrightarrow} B_q$$

is established when $w_R \geq 1$; and the relationship network of coal mine multi-disaster fusion early warning objects is constructed;

The relationship $R_1$ between objects established according to the formation mechanism is a fixed relationship, the relationship $R_1$ between objects established according to the production process is updated synchronously after a process flow is changed, the relationship $R_2$ between objects established according to the spatial topology is updated synchronously as positions of the objects are changed, and the relationship $R_3$ between objects established according to numerical correlation indexes is updated every other week.

Optionally, in the S2, hyper-parameter selection of the LSTM model needs to refer to stationarity and periodicity of time sequences of coal mine sensor monitoring objects; before model training, data is standardized by a normalization method; and for the model training, a cross entropy is used as a loss function, a gradient clipping method is used to constrain a gradient, a stochastic gradient descent method is used to optimize the model, and a prediction precision of the model on a test set is calculated successively.

Optionally, a window mean sequence of the sensor monitoring objects in the most recent period is used in analysis of the stationarity and periodicity of the time sequences of the sensor monitoring objects; stationarity analysis is performed on the sequence by a unit root test method; if the sequence is not stationary, stationarity analysis is performed after the sequence is further differentiated until the resulting sequence is stationary, so as to obtain a differential order $N_d$; if the sequence is stationary, the differential order is set to $N_d=0$; periodicity analysis is performed on the sequence by fast Fourier transform, a spectrum map of the sequence is drawn with a frequency as an abscissa and an amplitude as an ordinate, and a specific frequency $F_s$ of a signal is obtained by identifying a peak value, so as to obtain a sequence period $T=1/F_s$; and if no significant peak value exists in the spectrum map, the sequence does not have periodicity, and T=0.

Optionally, parameter selection of the LSTM model is:

For the LSTM model of a data input number d, a batch size n and a hidden unit number h of a sensor monitoring object, input data are $X_t \in R^{n \times d}$ and $y_t \in R^{n \times 1}$, and a design initialization hyper-parameter selection formula is as follows:

$$d = \max\left(\left\langle \frac{T}{\Delta t} \times 1.5 \right\rangle, \left\langle \frac{24 \times 3600}{\Delta t} \right\rangle\right) \tag{4}$$
$$h = \langle d * \ln(N_d + 2) \rangle$$

wherein T is a period of the sequence, $\Delta t$ is a pooling time window of the mean sequence, and $N_d$ is a stationary differential order of the sequence; and $\langle\ \rangle$ is a rounding operation.

Optionally, after the LSTM model is trained, the same parameters of the data are standardized to make predictions, and predicting results need to be reversely standardized for use; and based on the latest set of data input at the current time, an input mean value E and a predicted value $\hat{y}_1$ are obtained, $\hat{y}_1$ is pushed into the data input to obtain a predicted value $\hat{y}_2$, and the formula of a prediction trend index of the sensor monitoring object is as follows:

$$S = \max(\hat{y}_1, (\hat{y}_2 - \hat{y}_1) * \varepsilon + E) \tag{5}$$

wherein $\varepsilon$ is a scaling factor which takes different values for different types of sensor monitoring objects;

A duration of a first training data set of the LSTM model is not less than $T_m$; when increment in the data reaches $T_m$ and a total duration of the training data set is less than $10T_m$, the model is retrained once, and prediction precisions of two adjacent models in the next K times are compared and selected, during which the original model is still used for model prediction to balance data feature extraction and over-fitting.

Optionally, in the S4, after a prediction and early warning index of a coal mine has an early anomaly feature, the depth-first algorithm is used to traverse the relationship network of coal mine multi-disaster fusion early warning objects, and for each specific sensor monitoring object traversed, the LSTM model is used to calculate a prediction trend index S; if the value of the index S is normal, a current node is no longer deeply traversed; and if the value of the index S exceeds a threshold, it is considered that a current sensor monitoring object conforms to the natural fission rules, and the depth traversal is continued until the entire relationship network of early warning objects is traversed, so as to obtain correlation prediction and early warning indexes for natural fission anomaly deduction located at network endpoints, thus suggesting that the management should carry out targeted prediction and forecasting to realize multi-disaster fusion early warning.

A coal mine multi-disaster fusion natural fission early warning system, comprising:

A monitoring and early warning data acquisition and storage module used to collect sensor monitoring data and prediction and early warning index data of a coal mine safety monitoring system and various disaster prediction and early warning systems at a specified frequency and store the data in a fusion early warning database;

A relationship network constructing and updating module used to collect basic information of each sensor monitoring object and each prediction and early warning index object in a coal mine to generate a relationship entity list, then calculate a relationship weight between sensor monitoring objects and between a sensor monitoring object and a prediction and early warning index object by regularly editing a mechanism and process relationship and calculating geometric topology and correlation coefficients, and establish or update a relationship network of coal mine multi-disaster fusion early warning objects;

A fission model training and updating module used to regularly train LSTM parameters in each sensor monitoring data trend prediction model and select appropriate parameters by comparing prediction precisions of two prediction models;

A natural fission analyzing and pushing module used to traverse other disaster prediction and early warning indexes based on a depth-first traversal algorithm and natural fission rules after collecting abnormal information of a disaster prediction and early warning index, so as to highlight results on a user interface and push back the results to each prediction and early warning system.

The monitoring and early warning data acquisition and storage module is used for external data access to form an object data set; the relationship network constructing and updating module generates relationship entity object list data and weight data of the relationship between objects based on the object data set, and finally generates an object relationship network; meanwhile, the fission model training and updating module trains the LSTM model based on the object data set; and after the monitoring and early warning data acquisition and storage module recognizes an early anomaly feature of a prediction and early warning index, the natural fission analyzing and pushing module uses the depth-first algorithm to traverse the object relationship network, finds a prediction and early warning index for anomaly association based on the natural fission rules, and pushes result data.

The present invention has the advantages that: coal mine multi-disaster fusion natural fission early warning realizes whole body detection of a coal mine by fusing the existing disaster prediction and early warning index objects of the coal mine and the full sensor monitoring objects, the relationship network of coal mine multi-disaster fusion early warning objects is constructed through analysis of the relationship weight between a disaster prediction and early warning index and a sensor monitoring object and between a sensor monitoring object and a sensor monitoring object, and combined with decision rules of trend prediction indexes based on an artificial neural network algorithm, natural fission between coal mine objects is realized to trace back to other disaster prediction and early warning indexes, achieving multi-dimensional and timely analysis of coal mine disaster monitoring information, advanced trend prediction and multi-disaster fusion early warning.

Other advantages, objectives and features of the present invention will be illustrated in the following description to some extent, and will be apparent to those skilled in the art based on the following investigation and research to some extent, or can be taught from the practice of the present invention. The objectives and other advantages of the present invention can be realized and obtained through the following description.

DESCRIPTION OF THE DRAWINGS

To enable the purpose, the technical solution and the advantages of the present invention to be more clear, the present invention will be preferably described in detail below in combination with the drawings, wherein.

DETAILED DESCRIPTION OF THE INVENTION

Embodiments of the present invention are described below through specific embodiments. Those skilled in the art can understand other advantages and effects of the present invention easily through the disclosure of the description. The present invention can also be implemented or applied through additional different specific embodiments. All details in the description can be modified or changed based on different perspectives and applications without departing from the spirit of the present invention. It should be noted that the figures provided in the following embodiments only exemplarily explain the basic conception of the present invention, and if there is no conflict, the following embodiments and the features in the embodiments can be mutually combined.

Figure 1:
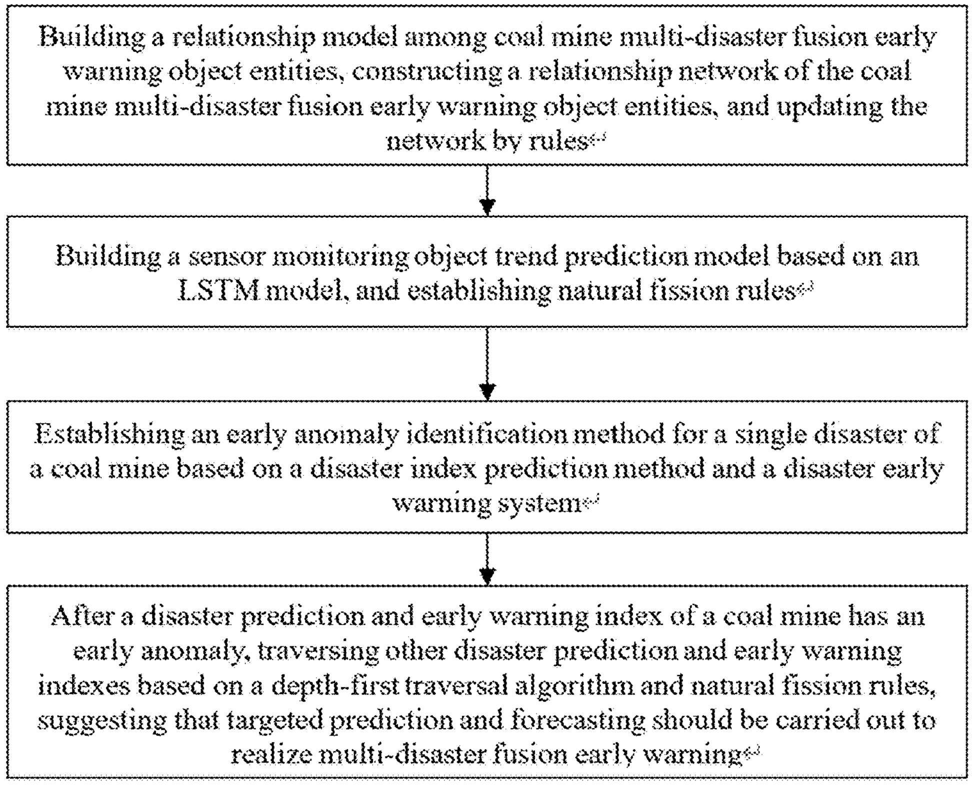
FIG. 1 is a flow chart of a coal mine multi-disaster fusion natural fission early warning method.
Figure 2:
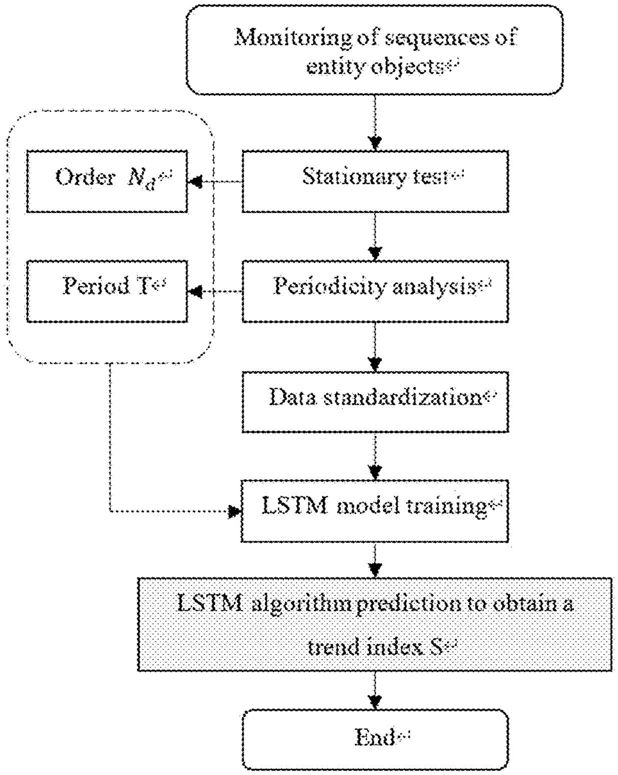
FIG. 2 is a flow chart of time sequence analysis and processing of a coal mine sensor monitoring object.
Figure 3:
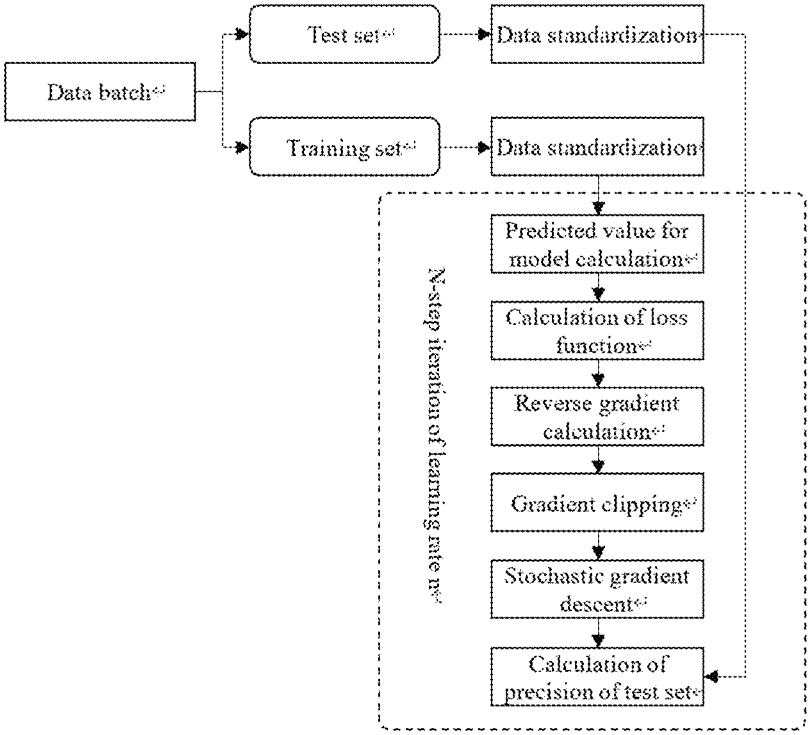
FIG. 3 is a flow chart of training of an LSTM model of a coal mine sensor monitoring object.
Figure 4:
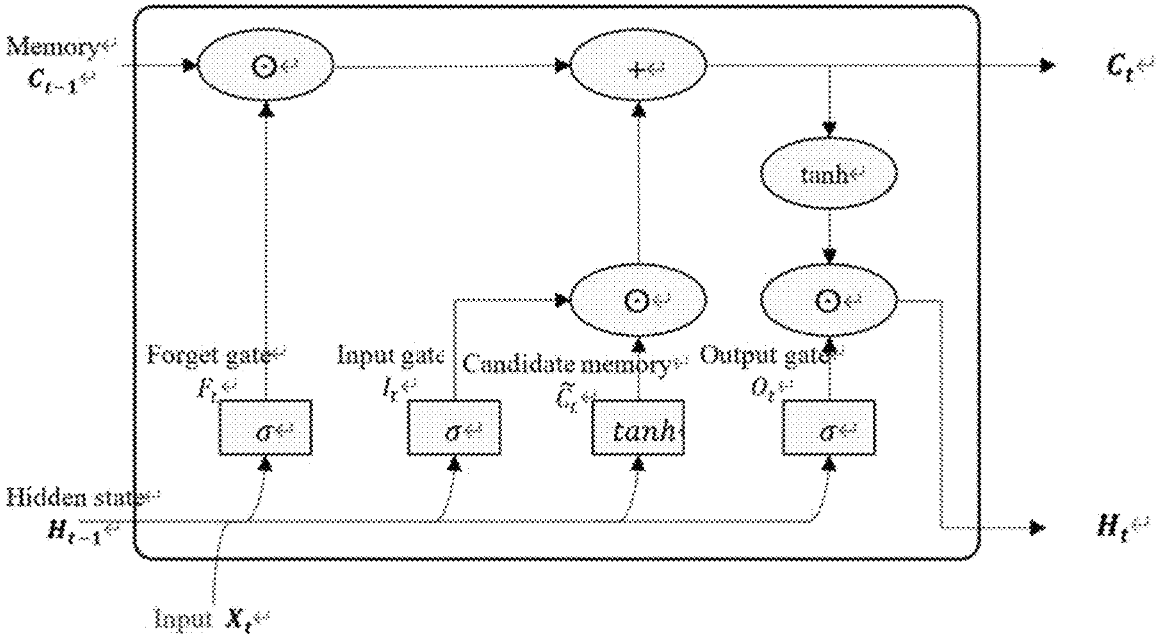
FIG. 4 is a flow chart of a calculation unit of an LSTM model of a coal mine sensor monitoring object.
Figure 5:
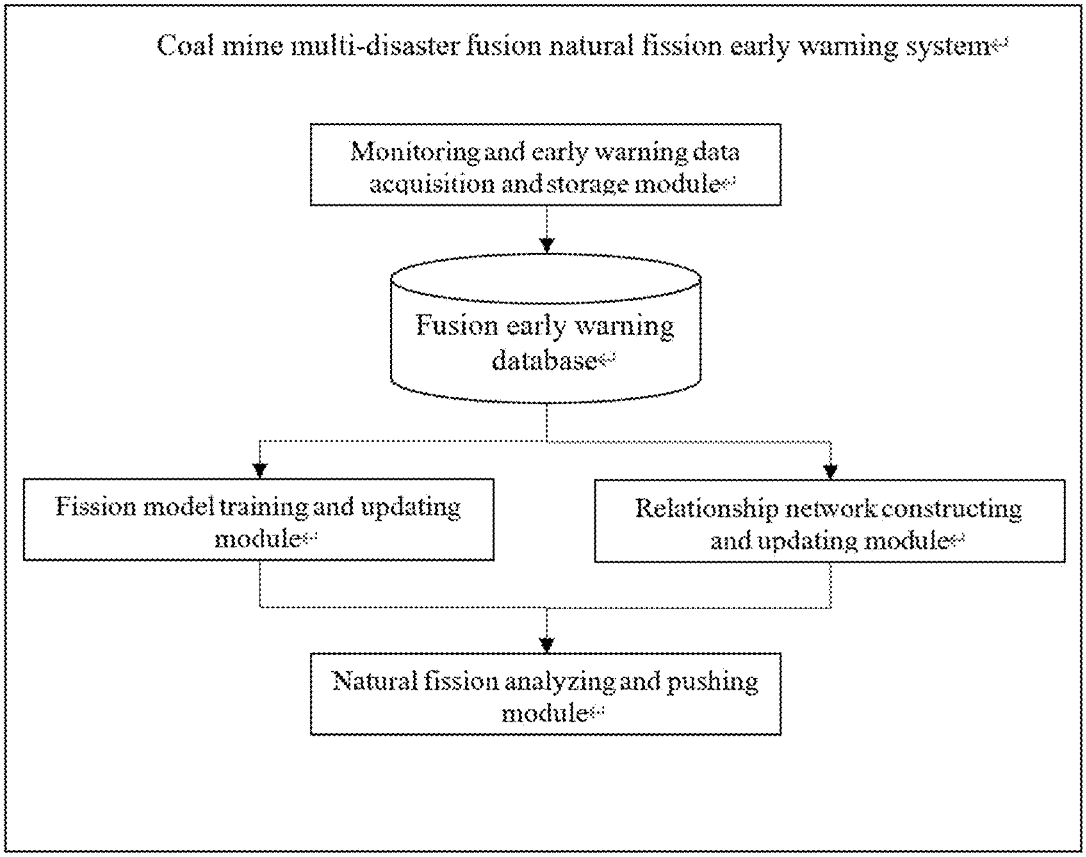
FIG. 5 is a module diagram of a coal mine multi-disaster fusion natural fission early warning system.

Referring to FIG. 1 to FIG. 5, the present invention provides a coal mine multi-disaster fusion natural fission early warning method, comprising the following steps:

S1: building a relationship model among coal mine multi-disaster fusion early warning object entities, constructing a relationship network of the coal mine multi-disaster fusion early warning object entities, and updating the network by rules;

S2: building a sensor monitoring object trend prediction model based on an LSTM model of an LSTM artificial neural network, and establishing natural fission rules;

S3: establishing an early anomaly identification method for a single disaster of a coal mine based on a disaster index prediction method and a disaster early warning system;

S4: after a disaster prediction and early warning index of a coal mine is abnormal, traversing other disaster prediction and early warning indexes based on a depth-first traversal algorithm and natural fission rules, suggesting that targeted prediction and forecasting should be carried out to realize multi-disaster fusion early warning.

Further, the coal mine multi-disaster fusion early warning object entities referred to in step S1 include prediction and early warning indexes for a single disaster and sensor monitoring objects. If a sequence $\{x_t\}$ of an object X and a sequence $\{y_t\}$ of an object Y have a relationship set R, the relationship therebetween can be defined as $$X \overset{R}{\longleftrightarrow} Y.$$

According to different ways of relationship acquisition, the relationship is divided into a relationship $R_1$ based on a formation mechanism and a production process, a position relationship $R_2$ based on spatial topology and a numerical relationship $R_3$ based on a correlation coefficient. The relationship $R_1$ is inquired from coal mine disaster prediction and early warning data and production process specifications. The relationship $R_2$ is obtained by a spatial topology algorithm of a coal mine geographic information system. The relationship $R_3$ is solved by a correlation coefficient index for a pooling value sequence for a specific time window.

A relationship weight $w_R$ of the objects X and Y is the sum of multiple relationship weights thereof, and the specific formula is as follows:

$$w_R = \sum_{i=1,2,3} w_{R_i} \tag{1}$$

wherein $w_{R_i}$ is a weight corresponding to an $i^{th}$ relationship type between the objects X and Y; and a corresponding relationship between a relationship type and a relationship weight of multi-disaster fusion natural fission objects is shown in the following table.

TABLE 1

Corresponding Relationship between Relationship Type and Relationship Weight of Multi-disaster Fusion Natural Fission Objects

| Relationship Type | Assessment Index | Value Description | Relationship Weight |
|---|---|---|---|
| Mechanism process relationship $R_1$ | Mechanism process | Physical mechanics relationship | 1 |
| | | Upstream and downstream of process | 0.5 |
| Position relationship $R_2$ | Spatial topology | Inclusion or intersection | 0.5 |
| | | Adjacency (within 20 m) | 0.2 |
| Numerical relationship $R_3$ | Correlation coefficient index P | $P \in (0.8, 1]$ | 0.8 |
| | | $P \in (0.6, 0.8]$ | 0.5 |
| | | $P \in (0.4, 0.6]$ | 0.2 |

Further, the numerical relationship $R_3$ is solved by a correlation coefficient of a pooling value sequence for a specific time window, specifically:

For a prediction and early warning index A and a sensor monitoring object B corresponding to a coal mine disaster, a time step of A is set to Δt; based on data in the most recent period, a maximum value, a minimum value and a mean value of a pooling index of B in a time window Δt are used to generate a pooling sequence $B_k$, wherein k=1, 2, 3; then a correlation coefficient $r_k$ of a sequence pair of A and $B_k$ is calculated; a time window of the prediction and early warning index A is Δt, and a correlation coefficient index of the prediction and early warning index A and the sensor monitoring object B is calculated by the following formula:

$$P_{AB} = \max_{k=1,2,3}(|r_k|) \tag{2}$$

For a sensor monitoring object $B_p$ and a sensor monitoring object $B_q$, based on the data in data in the most recent period, the mean value of the pooling index in the time window is used to obtain two mean sequences $\overline{B_p}$ and $\overline{B_q}$, then a correlation coefficient absolute value $|r_{pq}|$ of the sequence pair is calculated, and a correlation coefficient index of the sensor monitoring objects $B_p$ and $B_q$ is calculated by the following formula:

$$P_{B_pB_q} = |r_{pq}| \tag{3}$$

Further, the relationship network of coal mine multi-disaster fusion early warning objects proposed in step S1 is constructed and updated by rules. For a disaster prediction and early warning index set $\{A_i\}$ and a sensor monitoring object set $\{B_j\}$, i, j∈$R^+$, relationships $R_1$, $R_2$ and $R_3$ between $A_i$ and $B_j$ are analyzed in turn, a relationship weight $w_R$ is looked up in a table and calculated, and a relationship $$A_i \overset{R:w_R}{\longleftrightarrow} B_j$$

is established when $w_R \geq 1$. For the sensor monitoring object set $\{B_j\}$, j∈$R^+$, relationships $R_1$, $R_2$ and $R_3$ between objects $B_p$ and $B_q$ are analyzed in turn, a relationship weight $w_R$ is looked up in a table and calculated, and a relationship $$B_p \overset{R:w_R}{\longleftrightarrow} B_q$$

is established when $w_R \geq 1$. Based on this, the relationship network of coal mine multi-disaster fusion early warning objects is constructed.

The relationship $R_1$ between objects established according to the formation mechanism is a fixed relationship, the relationship $R_1$ between objects established according to the production process is updated synchronously after a process flow is changed, the relationship $R_2$ between objects established according to the spatial topology is updated synchronously as positions of the objects are changed, and the relationship $R_3$ between objects established according to numerical correlation indexes is updated every other week.

Further, hyper-parameter selection of the LSTM model proposed in step S2 needs to refer to stationarity and periodicity of time sequences of coal mine sensor monitoring objects. Before model training, it is necessary to standardize data by a normalization method. and for the model training, a cross entropy is used as a loss function, a gradient clipping method is used to constrain a gradient, a stochastic gradient descent method is used to optimize the model, and a prediction precision of the model on a test set is calculated successively.

Further, a window mean sequence of the sensor monitoring objects in the most recent period is used in analysis of the stationarity and periodicity of the time sequences of the sensor monitoring objects. stationarity analysis is performed on the sequence by a unit root test method; if the sequence is not stationary, stationarity analysis is performed after the sequence is further differentiated until the resulting sequence is stationary, so as to obtain a differential order $N_d$; and if the sequence is stationary, the differential order is set to $N_d=0$. periodicity analysis is performed on the sequence by fast Fourier transform, a spectrum map of the sequence is drawn with a frequency as an abscissa and an amplitude as an ordinate, and a specific frequency $F_s$ of a signal is obtained by identifying a peak value, so as to obtain a sequence period $T=1/F_s$; and if no significant peak value exists in the spectrum map, the sequence does not have periodicity, and T=0.

Further, with regard to parameter selection of the LSTM model, for the LSTM training model of a data input number d, a batch size n and a hidden unit number h of a sensor monitoring object, input data are $X_t \in R^{n\times d}$ and $y_t \in R^{n\times 1}$, and a design initialization hyper-parameter selection formula is as follows:

$$d = \max\left(\left\langle \frac{T}{\Delta t} \times 1.5 \right\rangle, \left\langle \frac{24 \times 3600}{\Delta t} \right\rangle\right) \tag{4}$$

$$h = \langle d * \ln(N_d + 2) \rangle$$

wherein T is a period of the sequence, Δt is a pooling time window of the mean sequence, and $N_d$ is a stationary differential order of the sequence. ⟨ ⟩ is a rounding operation.

Further, gated memory elements used by the LSTM model comprise a forget gate $F_t \in R^{n\times h}$, an input gate $I_t \in R^{n\times h}$, a candidate memory $\tilde{C}_t \in R^{n\times h}$, an output gate $O_t \in R^{n\times h}$, a memory $C_t \in R^{n\times h}$ and a hidden state $H_t \in R^{n\times h}$. An iterative formula of the LSTM model is as follows:

$$C_{t+1}, H_{t+1}, \hat{y} = LSTM(C_t, H_t, X_t) \tag{5}$$

wherein $\hat{y}$ is a predicted value, and initialization values $C_0$ and $H_0$ of the memory and the hidden state are matrixes with all elements equal to 0.

Further, after the LSTM model is trained, the same parameters of the data are standardized to make predictions, and predicting results need to be reversely standardized for use. Based on the latest set of data input at the current time, an input mean value E and a predicted value $\hat{y}_1$ are obtained, $\hat{y}_1$ is pushed into the data input to obtain a predicted value $\hat{y}_2$, and the formula of a prediction trend index of the sensor monitoring object is as follows:

$$S = \max(\hat{y}_1, (\hat{y}_2 - \hat{y}_1) * \varepsilon + E) \tag{6}$$

wherein ε is a scaling factor which takes different values for different types of sensor monitoring objects.

A duration of a first training data set of the LSTM model is not less than $T_m$; when increment in the data reaches $T_m$ and a total duration of the training data set is less than $10T_m$, the model is retrained once, and prediction precisions of two adjacent models in the next K times are compared and selected, during which the original model is still used for model prediction to balance data feature extraction and over-fitting.

The thresholds of trend indexes of the sensor monitoring objects are determined according to required values of various sensor monitoring objects in Coal Mine Safety Regulations and other coal mine management documents.

Further, in an early anomaly identification method for a single disaster of a coal mine proposed in step S3, disaster prediction indexes proposed in Coal Mine Safety Regulations, Regulations on Prevention and Control of Coal and Gas Outburst, Regulations on Mine Water Prevention and Control, Rules for Fire Prevention and Control in Coal Mine, Rules for Prevention and Control of Rock Burst in Coal Mine and other documents are defined to have an early anomaly feature corresponding to a disaster when the measured values of the indexes reach 80% of the specified threshold. For a mine self-built disaster early warning system based on geophysical exploration, technology and monitoring mechanism analysis, the indexes are defined to have an early anomaly feature corresponding to a disaster when the values of the indexes reach the lowest early warning level.

Further, it is proposed in step S4 that after a prediction and early warning index of a coal mine has an early anomaly feature, the depth-first algorithm is used to traverse the relationship network of coal mine multi-disaster fusion early warning objects, and for each specific sensor monitoring object traversed, the LSTM model is used to calculate a prediction trend index S. if the value of the index S is normal, a current node is no longer deeply traversed; and if the value of the index S exceeds a threshold, it is considered that a current sensor monitoring object conforms to the natural fission rules, and the depth traversal is continued until the entire relationship network of early warning objects is traversed, so as to obtain correlation prediction and early warning indexes for natural fission anomaly deduction located at network endpoints, thus suggesting that the management should carry out targeted prediction and forecasting to realize multi-disaster fusion early warning.

Further, a coal mine multi-disaster fusion natural fission early warning system comprises four modules:

A monitoring and early warning data acquisition and storage module used to collect sensor monitoring data and prediction and early warning index data of a coal mine safety monitoring system and various disaster prediction and early warning systems at a specified frequency and store the data in a fusion early warning database.

A relationship network constructing and updating module used to collect basic information of each sensor monitoring object and each prediction and early warning index object in a coal mine to generate a relationship entity list, then calculate a relationship weight between sensor monitoring objects and between a sensor monitoring object and a prediction and early warning index object by regularly editing a mechanism and process relationship and calculating geometric topology and correlation coefficients, and establish or update a relationship network of coal mine multi-disaster fusion early warning objects.

A fission model training and updating module used to regularly train LSTM parameters in each sensor monitoring data trend prediction model and select appropriate parameters by comparing prediction precisions of two prediction models.

A natural fission analyzing and pushing module used to traverse other disaster prediction and early warning indexes based on a depth-first traversal algorithm and natural fission rules after collecting abnormal information of a disaster prediction and early warning index, so as to highlight results on a user interface and push back the results to each prediction and early warning system.

Further, the module relationship of a coal mine multi-disaster fusion natural fission early warning system is as follows:

Firstly, the monitoring and early warning data acquisition and storage module is used for external data access to form an object data set. Then, on one hand, the relationship network constructing and updating module generates relationship entity object list data and weight data of the relationship between objects based on the object data set, and finally generates an object relationship network; and on the other hand, the fission model training and updating module trains the LSTM model based on the object data set. Finally, after the monitoring and early warning data acquisition and storage module recognizes an early anomaly feature of a prediction and early warning index, the natural fission analyzing and pushing module uses the depth-first algorithm to traverse the object relationship network, finds a prediction and early warning index for anomaly association based on the natural fission rules, and pushes result data.

Finally, it should be noted that the above embodiments are only used for describing, rather than limiting the technical solution of the present invention. Although the present invention is described in detail with reference to the preferred embodiments, those ordinary skilled in the art shall understand that the technical solution of the present invention can be amended or equivalently replaced without departing from the purpose and the scope of the technical solution. The amendment or equivalent replacement shall be covered within the scope of the claims of the present invention.

The invention claimed is:

1. A coal mine multi-disaster fusion natural fission early warning method, wherein the method performed by a coal mine multi-disaster fusion natural fission early warning system for coal mines equipped with a processor and memory, comprises the following steps wherein:

S1: the processor collects sensor monitoring data and prediction and early warning index data from the coal mine safety monitoring system and the disaster early warning system and stores them in the fusion early warning database; based on the data in the database, thereby building a relationship model among coal mine multi-disaster fusion early warning object entities, wherein the entities include sensor monitoring objects and prediction and early warning indices; the processor calculates the first relationship weight between entities based on formation mechanisms and production processes, calculates the second relationship weight based on spatial topology algorithms, and calculates the third relationship weight based on correlation coefficient algorithms; sum these three relationship weights to construct a relationship network of the coal mine multi-disaster fusion early warning object entities, and based on changes in physical mechanisms, spatial locations, and numerical relationships, have the processor update the network according to established rules;

S2: the processor analyzes the time-series data collected from the sensor monitoring objects in the database, including stationarity analysis using unit root tests and periodicity analysis using the fast Fourier transform; based on the analysis results, thereby building a sensor monitoring object trend prediction model based on a long short term memory (LSTM) model of an LSTM artificial neural network, based on the output of the trend prediction model, and establishing natural fission analysis rules;

S3: the processor establishes an early anomaly identification method for a single disaster of a coal mine based on a disaster index prediction method and a disaster early warning system;

S4: responsive to the processor identifying an early anomaly feature in a specific coal mine prediction and early warning index, the processor triggers a depth-first traversal algorithm to traverse the associated sensor monitoring object nodes within the object relationship network; wherein for each traversed node, the LSTM model is invoked to calculate the trend prediction index S, and a decision is made based on the natural fission rules as to whether to continue traversing; upon completion of the traversal, the processor automatically generates an alert containing the correlation prediction and early warning indexes and targeted prediction and forecasting measures, and pushes it to the user interface to achieve multi-disaster fusion early warning.

2. The coal mine multi-disaster fusion natural fission early warning method as claimed in claim 1, characterized in that: in the S1, the coal mine multi-disaster fusion early warning object entities include prediction and early warning indexes for a single disaster and sensor monitoring objects;

if a sequence $\{x_t\}$ of an object X and a sequence $\{y_t\}$ of an object Y have a relationship set R, the relationship therebetween is defined as $$X \overset{R}{\leftrightarrow} Y;$$

according to different ways of relationship acquisition, the relationship is divided into a relationship $R_1$ based on a formation mechanism and a production process, a position relationship $R_2$ based on spatial topology and a numerical relationship $R_3$ based on a correlation coefficient; the relationship $R_1$ is inquired from coal mine disaster prediction and early warning data and production process specifications; the relationship $R_2$ is obtained by a spatial topology algorithm of a coal mine geographic information system; and the relationship $R_3$ is solved by a correlation coefficient index for a pooling value sequence for a specific time window;

a relationship weight $w_R$ of the objects X and Y is the sum of multiple relationship weights thereof, and the specific formula is as follows:

$$w_R = \sum_{i=1,2,3} w_{R_i} \tag{1}$$

wherein $w_{R_i}$ is a weight corresponding to an $i^{th}$ relationship type between the objects X and Y; and a corresponding relationship between a relationship type and a relationship weight of multi-disaster fusion natural fission objects is:

the relationship type based on a formation mechanism and a production process $R_1$, an assessment index is a mechanism process, a relationship weight of a physical mechanics relationship is 1, and a relationship weight of upstream and downstream of the process is 0.5;

the relationship type is a position relationship $R_2$, an assessment index is spatial topology, a relationship weight of inclusion or intersection is 0.5, and a relationship weight of adjacency within 20 m is 0.2;

the relationship type is a numerical relationship $R_3$, an assessment index is a correlation coefficient index P, a relationship weight of $P \in (0.8,1]$ is 0.8, a relationship weight of $P \in (0.6,0.8]$ is 0.5, and a relationship weight of $P \in (0.4,0.6]$ is 0.2.

3. The coal mine multi-disaster fusion natural fission early warning method as claimed in claim 2, characterized in that: the numerical relationship $R_3$ is solved by a correlation coefficient of a pooling value sequence for a specific time window, specifically:

for a prediction and early warning index A and a sensor monitoring object B corresponding to a coal mine disaster, a time step of A is set to $\Delta t$; based on data in the most recent period, a maximum value, a minimum value and a mean value of a pooling index of B in a time window $\Delta t$ are used to generate a pooling sequence $B_k$, wherein k=1, 2, 3; then a correlation coefficient $r_k$ of a sequence pair of A and $B_k$ is calculated; a time window of the prediction and early warning index A is $\Delta t$, and a correlation coefficient index of the prediction and early warning index A and the sensor monitoring object B is calculated by the following formula:

$$P_{AB} = \max_{k=1,2,3}(|r_k|) \tag{2}$$

for a sensor monitoring object $B_p$ and a sensor monitoring object $B_q$, based on the data in data in the most recent period, the mean value of the pooling index in the time window is used to obtain two mean sequences $\overline{B_p}$ and $\overline{B_q}$, then a correlation coefficient absolute value $|r_{pq}|$ of the sequence pair is calculated, and a correlation coefficient index of the sensor monitoring objects $B_p$ and $B_q$ is calculated by the following formula:

$$P_{B_pB_q} = |r_{pq}|. \tag{3}$$

4. The coal mine multi-disaster fusion natural fission early warning method as claimed in claim 1, characterized in that: in the S1, the step of constructing a relationship network of coal mine multi-disaster fusion early warning objects and updating the network by rules is specifically:

for a disaster prediction and early warning index set $\{A_i\}$ and a sensor monitoring object set $\{B_j\}$, $i, j \in R^+$, relationships $R_1$, $R_2$ and $R_3$ between $A_i$ and $B_j$ are analyzed in turn, a relationship weight $w_R$ is looked up in a table and calculated, and a relationship $$A_i \overset{R:w_R}{\longleftrightarrow} B_j$$

is established when $w_R \geq 1$; for the sensor monitoring object set $\{B_j\}$, $j \in R^+$, relationships $R_1$, $R_2$ and $R_3$ between objects $B_p$ and $B_q$ are analyzed in turn, a relationship weight $w_R$ is looked up in a table and calculated, and a relationship $$B_p \overset{R:w_R}{\longleftrightarrow} B_q$$

is established when $w_R \geq 1$; and the relationship network of coal mine multi-disaster fusion early warning objects is constructed;

the relationship $R_1$ between objects established according to the formation mechanism is a fixed relationship, the relationship $R_1$ between objects established according to the production process is updated synchronously after a process flow is changed, the relationship $R_2$ between objects established according to the spatial topology is updated synchronously as positions of the objects are changed, and the relationship $R_3$ between objects established according to numerical correlation indexes is updated every other week.

5. The coal mine multi-disaster fusion natural fission early warning method as claimed in claim 1, characterized in that: in the S2, hyper-parameter selection of the LSTM model needs to refer to stationarity and periodicity of time sequences of coal mine sensor monitoring objects; before model training, data is standardized by a normalization method; and for the model training, a cross entropy is used as a loss function, a gradient clipping method is used to constrain a gradient, a stochastic gradient descent method is used to optimize the model, and a prediction precision of the model on a test set is calculated successively.

6. The coal mine multi-disaster fusion natural fission early warning method as claimed in claim 1, characterized in that: a window mean sequence of the sensor monitoring objects in the most recent period is used in analysis of the stationarity and periodicity of the time sequences of the sensor monitoring objects; stationarity analysis is performed on the sequence by a unit root test method; if the sequence is not stationary, stationarity analysis is performed after the sequence is further differentiated until the resulting sequence is stationary, so as to obtain a differential order $N_d$; if the sequence is stationary, the differential order is set to $N_d=0$; periodicity analysis is performed on the sequence by fast Fourier transform, a spectrum map of the sequence is drawn with a frequency as an abscissa and an amplitude as an ordinate, and a specific frequency $F_s$ of a signal is obtained by identifying a peak value, so as to obtain a sequence period $T=1/F_s$; and if no significant peak value exists in the spectrum map, the sequence does not have periodicity, and T=0.

7. The coal mine multi-disaster fusion natural fission early warning method as claimed in claim 5, characterized in that: parameter selection of the LSTM model is:

for the LSTM model of a data input number d, a batch size n and a hidden unit number h of a sensor monitoring object, input data are $X_t \in R^{n \times d}$ and $y_t \in R^{n \times 1}$, and a design initialization hyper-parameter selection formula is as follows:

$$d = \max\left(\left\langle \frac{T}{\Delta t} \times 1.5 \right\rangle, \left\langle \frac{24 \times 3600}{\Delta t} \right\rangle\right) \tag{4}$$

$$h = \langle d * \ln(N_d + 2) \rangle$$

wherein T is a period of the sequence, $\Delta t$ is a pooling time window of the mean sequence, and $N_d$ is a stationary differential order of the sequence; and is $\langle\ \rangle$ rounding operation.

8. The coal mine multi-disaster fusion natural fission early warning method as claimed in claim 5, characterized in that: after the LSTM model is trained, the same parameters of the data are standardized to make predictions, and predicting results need to be reversely standardized for use; and based on the latest set of data input at the current time, an input mean value E and a predicted value $\hat{y}_1$ are obtained, $\hat{y}_1$ is pushed into the data input to obtain a predicted value $\hat{y}_2$, and the formula of a prediction trend index of the sensor monitoring object is as follows:

$$S=\max(\hat{y}_1, (\hat{y}_2-\hat{y}_1)*\varepsilon+E) \quad (5)$$

wherein ε is a scaling factor which takes different values for different types of sensor monitoring objects;

a duration of a first training data set of the LSTM model is not less than $T_m$; when increment in the data reaches $T_m$ and a total duration of the training data set is less than $10T_m$, the model is retrained once, and prediction precisions of two adjacent models in the next K times are compared and selected, during which the original model is still used for model prediction to balance data feature extraction and over-fitting.

9. The coal mine multi-disaster fusion natural fission early warning method as claimed in claim 1, characterized in that: in the S4, after a prediction and early warning index of a coal mine has an early anomaly feature, the depth-first algorithm is used to traverse the relationship network of coal mine multi-disaster fusion early warning objects, and for each specific sensor monitoring object traversed, the LSTM model is used to calculate a prediction trend index S; if the value of the index S is normal, a current node is no longer deeply traversed; and if the value of the index S exceeds a threshold, it is considered that a current sensor monitoring object conforms to the natural fission rules, and the depth traversal is continued until the entire relationship network of early warning objects is traversed, so as to obtain correlation prediction and early warning indexes for natural fission anomaly deduction located at network endpoints, thus suggesting that the management should carry out targeted prediction and forecasting to realize multi-disaster fusion early warning.

10. A coal mine multi-disaster fusion natural fission early warning system, wherein the system comprises a processor and a memory, and the processor is configured to execute the following modules:

a monitoring and early warning data acquisition and storage module used to collect sensor monitoring data and prediction and early warning index data of a coal mine safety monitoring system and various disaster prediction and early warning systems at a specified frequency and store the data in a fusion early warning database;

a relationship network constructing and updating module used to collect basic information of each sensor monitoring object and each prediction and early warning index object in a coal mine to generate a relationship entity list, then calculate a relationship weight between sensor monitoring objects and between a sensor monitoring object and a prediction and early warning index object by periodically editing the first relationships based on formation mechanisms and production processes, the second relationships based on spatial topology, and the third relationships based on correlation coefficients, and establish or update a relationship network of coal mine multi-disaster fusion early warning objects;

a fission model training and updating module used to regularly train LSTM parameters in each sensor monitoring data trend prediction model and select appropriate parameters by comparing prediction precisions of two prediction models;

a natural fission analyzing and pushing module used to traverse the object relationship network using a depth-first traversal algorithm when an early anomaly feature is detected in the prediction and early warning index, response to the sensor monitoring objects identified during the traversal, the natural fission analyzing and pushing model invokes the LSTM model to calculate the trend prediction index S; based on natural fission rules, thereby determining whether to continue traversing to identify abnormally correlated prediction and early warning indexes located at network endpoints, and highlighting the result data on the user interface before pushing back to the respective prediction and early warning systems;

wherein the monitoring and early warning data acquisition and storage module is used for external data access to form an object data set; the relationship network constructing and updating module generates relationship entity object list data and weight data of the relationship between objects based on the object data set, and finally generates an object relationship network; meanwhile, the fission model training and updating module trains the LSTM model based on the object data set; and after the monitoring and early warning data acquisition and storage module recognizes an early anomaly feature of a prediction and early warning index, the natural fission analyzing and pushing module uses the depth-first algorithm to traverse the object relationship network, finds a prediction and early warning index for anomaly association based on the natural fission rules, and pushes result data.

* * * * *